US012412522B2

(12) United States Patent
Walters et al.

(10) Patent No.: US 12,412,522 B2
(45) **Date of Patent: *Sep. 9, 2025**

(54) SYSTEMS AND METHODS FOR CORRECTING AMBIENT-LIGHT ILLUMINANCE DIFFERENCES OF AMBIENT LIGHT DIRECTED ONTO REGIONS OF A DISPLAY

(71) Applicant: Capital One Services, LLC, McLean, VA (US)

(72) Inventors: Austin Walters, Savoy, IL (US); Jeremy Goodsitt, Champaign, IL (US)

(73) Assignee: Capital One Services, LLC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,236

(22) Filed: Aug. 26, 2024

(65) Prior Publication Data

US 2025/0140170 A1 May 1, 2025

Related U.S. Application Data

(63) Continuation of application No. 17/241,936, filed on Apr. 27, 2021, now Pat. No. 12,073,770, which is a (Continued)

(51) Int. Cl.
*G09G 3/32* (2016.01)

(52) U.S. Cl.
CPC ....... *G09G 3/32* (2013.01); *G09G 2320/0233* (2013.01); *G09G 2320/0693* (2013.01); *G09G 2360/141* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2003/0116773 | A1 | 6/2003 | Kraus et al. |
| 2003/0193489 | A1 | 10/2003 | Koyama |

(Continued)

OTHER PUBLICATIONS

Ding et al., "Micro-LEDs, a Manufacturability Perspective", Appl. Sci. 2019, 9, 1206.

(Continued)

*Primary Examiner* — Sahlu Okebato
(74) *Attorney, Agent, or Firm* — Greenberg Traurig, LLP

(57) ABSTRACT

An apparatus includes a display, a memory, a light sensor array and a light source array. The light source array emits light to display an image on the display. A controller is configured to receive a sensor output from each light sensor in the light sensor array. An ambient-light illuminance difference between a first illuminance of a first ambient light externally directed onto a first region of the displayed image of the display and a second illuminance of a second ambient light externally directed respectively onto a second region of the displayed image of the display is computed. Light source controls of light sources of the light source array are varied to change a luminous emittance of the light source array within the at least one second region of the displayed image so as to reduce a luminance difference between the first region and the second region of the displayed image.

20 Claims, 6 Drawing Sheets

Related U.S. Application Data continuation of application No. 16/703,020, filed on Dec. 4, 2019, now Pat. No. 11,030,944.

(56) References Cited

U.S. PATENT DOCUMENTS

| | | | | |
|---|---|---|---|---|
| 2005/0184952 | A1 | 8/2005 | Konno et al. | |
| 2007/0120765 | A1 | 5/2007 | Misonou et al. | |
| 2009/0231313 | A1* | 9/2009 | Teranishi | G09G 3/3406 345/207 |
| 2010/0281434 | A1 | 11/2010 | Schroder et al. | |
| 2011/0050661 | A1 | 3/2011 | Chou et al. | |
| 2011/0109565 | A1 | 5/2011 | Zhu et al. | |
| 2017/0168295 | A1* | 6/2017 | Iwami | G02B 27/0093 |
| 2018/0154032 | A1 | 6/2018 | Dombrowsky et al. | |
| 2019/0221156 | A1 | 7/2019 | Yan et al. | |
| 2020/0319731 | A1 | 10/2020 | Yazdandoost et al. | |
| 2021/0012750 | A1* | 1/2021 | Kwon | G09G 5/10 |

OTHER PUBLICATIONS

Soneira, “Tablet Displays Under Bright Ambient Lighting Shoot-Out”; Nov. 18, 2019 <<www.displaymate.com/Tablet_Brightness_ShootOut_1.htm>.

* cited by examiner

SYSTEMS AND METHODS FOR CORRECTING AMBIENT-LIGHT ILLUMINANCE DIFFERENCES OF AMBIENT LIGHT DIRECTED ONTO REGIONS OF A DISPLAY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer displays, and more specifically to systems and methods for correcting ambient-light illuminance differences of ambient light directed onto regions of a display.

BACKGROUND OF TECHNOLOGY

A display may be used for a wide variety of applications such as in computer, cellphone, smartphone, tablet and television displays, for example. A display may be controlled by circuitry and a power supply all held in a casing.

SUMMARY OF DESCRIBED SUBJECT MATTER

In some embodiments, the present disclosure provides an exemplary technically improved computer-based apparatus that includes at least the following components:

a display with a front side and a back side;

a memory;

a light sensor array of light sensors and a light source array of light sources may be coupled to the back side of the display;

wherein the light source array of light sources may emit light to display an image on the display; and a controller configured to:

receive a sensor output from each light sensor in the light sensor array;

compute, using the received sensor outputs, an ambient-light illuminance difference between a first illuminance of a first ambient light externally directed onto a first region of the displayed image on the front side of the display and at least one second illuminance of a least one second ambient light externally directed respectively onto at least one second region of the displayed image on the front side of the display;

vary light source controls of light sources of the light source array to change a luminous emittance of the light source array within the at least one second region of the displayed image based on calibration data stored in the memory so as to reduce a luminance difference between the first region and each of the at least one second region of the displayed image;

wherein the calibration data may relate the luminous emittance from the light source array to the light source controls controlling the emitted light from the light sources of the light source array; and wherein the luminous emittance from the displayed image may be substantially opposite to the first illuminance of the first ambient light and the at least one second illuminance of the at least one second ambient light directed onto the displayed image.

In some embodiments, the present disclosure provides an exemplary technically improved computer-based method that includes at least the following steps of:

receiving, by a controller, sensor outputs from each light sensor in a light sensor array of light sensors of a display;

wherein the display may include a front side and a back side;

wherein the light sensor array of light sensors and a light source array of light sources may be coupled to the back side of the display;

wherein the light source array of light sources may emit light to display an image on the display;

computing, by the controller using the received sensor outputs, an ambient-light illuminance difference between a first illuminance of a first ambient light externally directed onto a first region of the displayed image on the front side of the display and at least one second illuminance of a least one second ambient light externally directed respectively onto at least one second region of the displayed image on the front side of the display;

varying, by the controller, light source controls of light sources of the light source array to change a luminous emittance of the light source array within the at least one second region of the displayed image based on calibration data stored in a memory so as to reduce a luminance difference between the first region and each of the at least one second region of the displayed image;

wherein the calibration data may relate the luminous emittance from the light source array to the light source controls controlling the emitted light from the light sources of the light source array; and wherein the luminous emittance from the displayed image may be substantially opposite to the first illuminance of the first ambient light and the at least one second illuminance of the at least one second ambient light directed onto the displayed image.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1A:
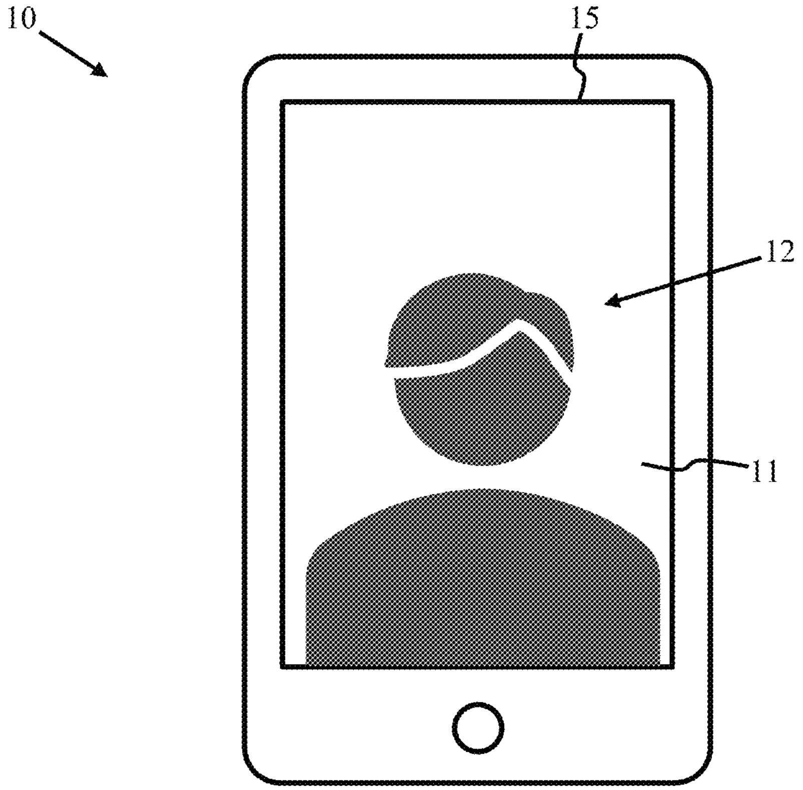
FIGS. 1A-1D show different views of a mobile device display with arrays of light sources and light sensors, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe methods and systems for correcting an ambient-light illuminance difference in ambient light directed onto a display. The ambient-light differences may be due from a randomly-shaped shadow cast by an object onto the display displaying an image, or from a bright beam of light hitting a display displaying an image in a darkened room, for example. A user of a mobile computing device, such as a smartphone, may be standing in sunlight and an object may cast a shadow on the display of the smartphone. In the shadow region on the smartphone display, the user may see the image better than the portion of the display in the direct sunlight. The regions with different ambient-illuminance projected onto the display image may distort the image as viewed by the user. In other embodiments, the display may also be a television and/or computer display, such as a liquid crystal display, for example.

To improve the user experience, exemplary embodiments taught herein provide methods and systems for changing the luminous emittance from the display in different regions with respectively different ambient illuminance projected onto the display, such as a shade from leaves of a tree blocking sunlight hitting a portion of the display image, for example. This shadow may be detected by light sensors in display causing the controller of the display to reduce the luminous emittance of light sources creating the displayed image of the display only within the shadow region on the display. Optionally, the controller may choose to increase the luminous emittance in the regions of direct sunlight outside of the shadow region. The overall effect may be to compensate the different regions of ambient-light illuminance impinging on the display (e.g., direct sunlight region versus shadowed region) by increasing and/or decreasing the luminous emittance in those regions to equalize a luminance difference from the different regions of ambient-light illuminance impinging on the display area of the mobile device display and directed into the eyes of the user.

FIGS. 1A-1D show different views of a mobile device display with arrays of light sources and light sensors, in accordance with one or more embodiments of the present disclosure.

Figure 1B:
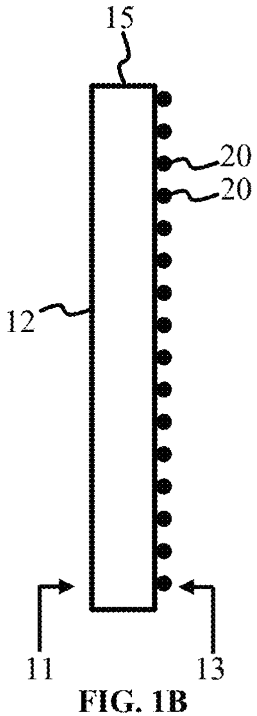
Figure 1C:
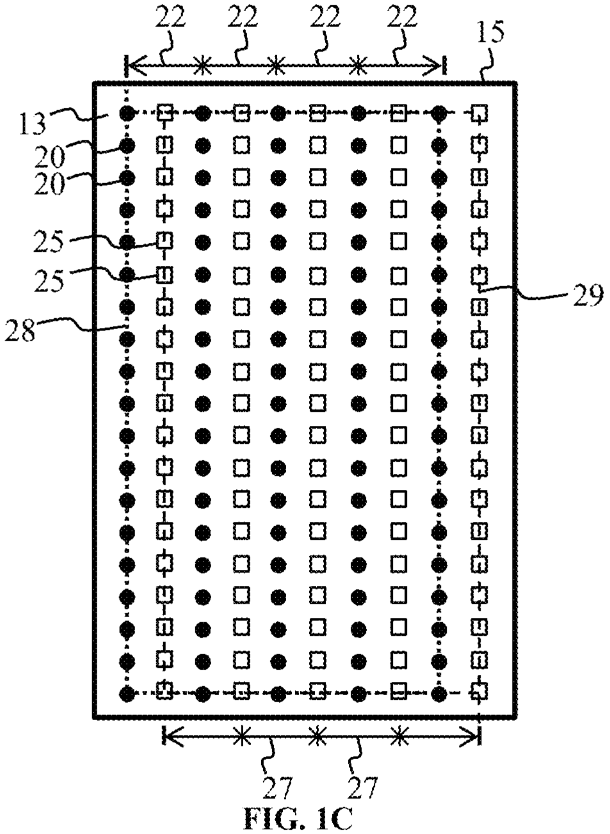
Figure 1D:
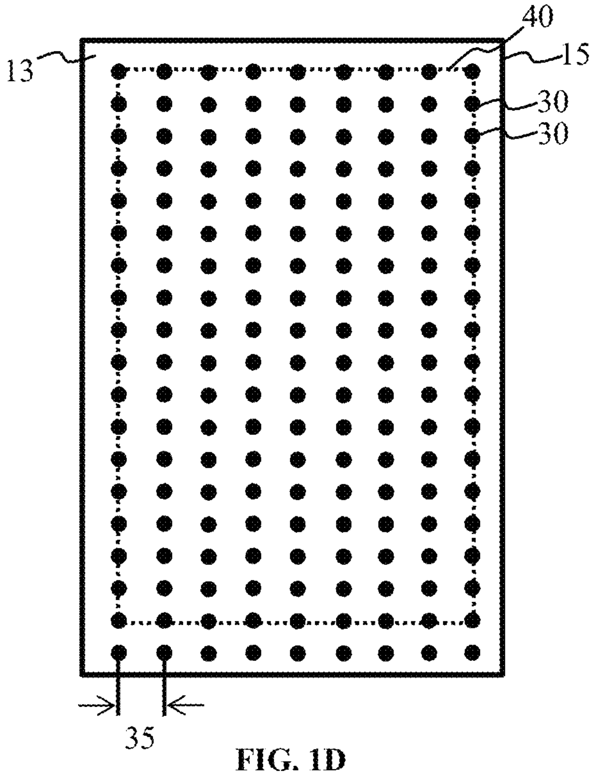

FIG. 1A shows an exemplary displayed image 12 of a face of a person displayed on a front side 11 of a display 15 of a cellphone 10. FIG. 1B shows a cross-sectional view of display 15 with front side 11 and a back side 13. Light sources 20, such as light emitting diodes (LED), for example, may be coupled to back side 13 to form displayed image 12 on front side 11. FIG. 1C shows back side 13 of display 13. Light sources 20 and light sensors 25 may be arranged in respective arrays on back side 13 such as light source array 28 of light sources 20 with a pitch 22 and light sensor array 29 of light sensors 25 with a pitch 27 as shown in FIG. 1C.

In some embodiments, both light sources 20 and light sensors 25 may be dual function diodes that are both light emitting and light sensing, and integrated into a source/sensor package 30. Multiple source/sensor packages 30 may be arranged in a same array 40 with a pitch 35 on back side 13 of display 15. In this case, the resolution of the display may be the pixel density. For example, an LCD display of 1080×768 pixels has a resolution of 1080×768 pixels.

In some embodiments, the light emitting diodes (LED) may be used both as a light source and a light sensor. In this case, some of the pixels may not be turned on and not emitting, which subsequently may be used for sensing.

In some embodiments, the number of light sources may include at least 2-10 light sources, at least 10-100 light sources, at least 100-1000 light sources, at least 1000-10000 light sources, at least 10000-100000 light sources, at least 100000-1000000 light sources, at least 1000000-10000000 light sources, and at least 10000000-50,000,000 light sources.

Similarly, in some embodiments, the number of light sensors may include at least 2-10 light sensors, at least 10-100 light sensors, at least 100-1000 light sensors, at least 1000-10000 light sensors, at least 10000-100000 light sensors, at least 100000-1000000 light sensors, at least 1000000-10000000 light sensors, and at least 10000000-50,000,000 light sensors.

In some embodiments, light sources 20 in light source array 28 and light sensors 25 in light sensor array 29 are not limited to being coupled to back side 13, but may be disposed on and/or within display 15 in any suitable arrangement.

Figure 2:
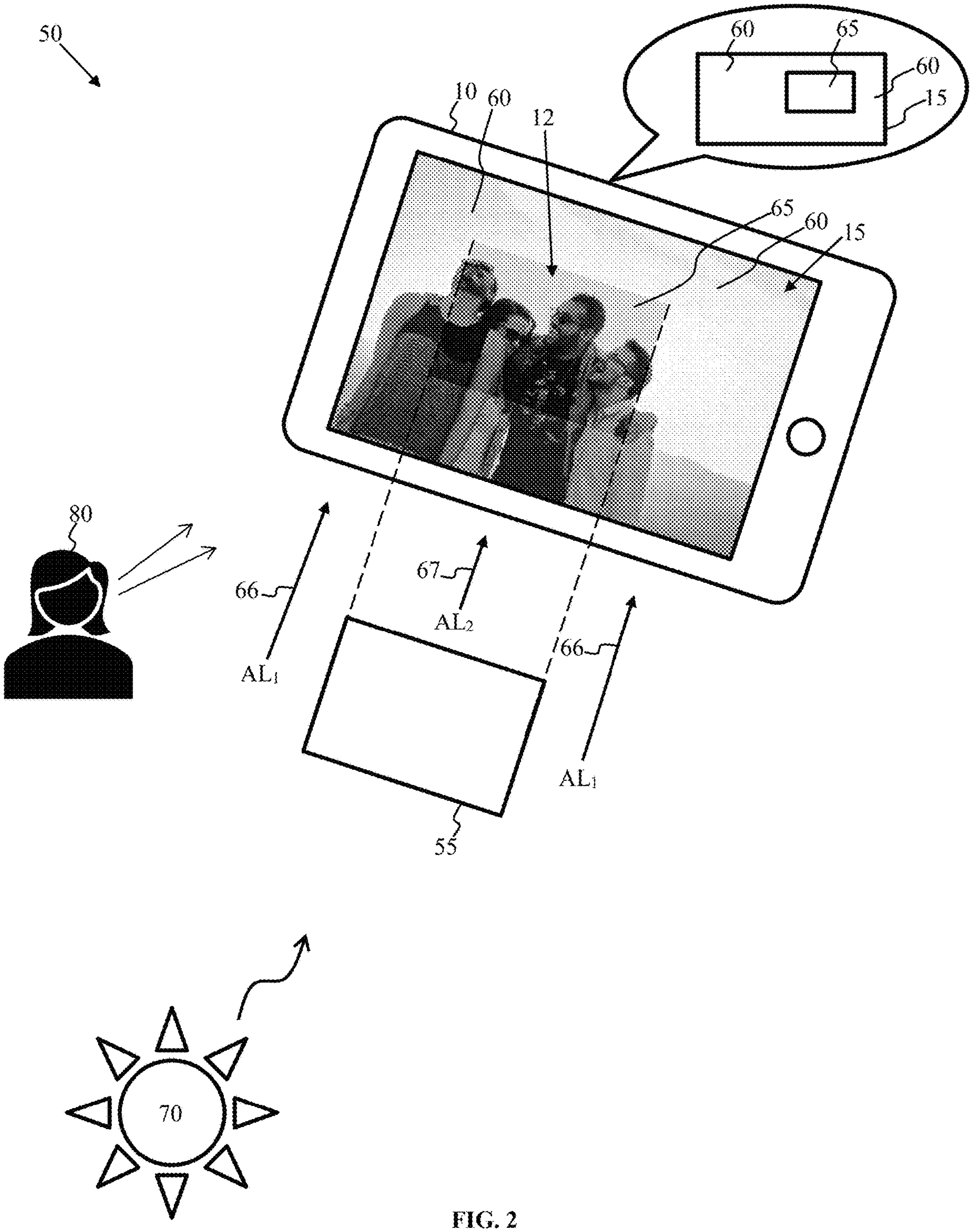
FIG. 2 shows an exemplary embodiment of a change in ambient-light illuminance by a shadow cast on a mobile device display, in accordance with one or more embodiments of the present disclosure.

FIG. 2 shows an exemplary embodiment 50 of a change in ambient-light illuminance by a shadow cast on mobile device display 15, in accordance with one or more embodiments of the present disclosure. Ambient-light such as sunlight from sun 70 may impinge on display 12 of an image 12 of people. Image 12 as perceived by a user 80, such as from the emitted light from the display image and the reflected ambient light, may be appear as bright, over-saturated and/or washed out in region 60 of display 15 while user 80 observes image 12 in the bright ambient light from sun 70.

However, the sunlight from sun 70 may be obstructed by an obstruction 55 which may cause a shadow to be cast onto or directed onto display 15 on in a region 65. This may cause the ambient-light (e.g., sunlight) impinging on display 15 to have a lower ambient light illuminance 67 in region 65 denoted $AL_2$ relative to the ambient light illuminance 66 of the direct ambient sunlight denoted $AL_1$ from sun 70. User 80 may perceive a sharper image and with better contrast in region 65 due to the reduced ambient-light illuminance relative to region 60 of image 12.

Conversely, user 80 may perceive a washed out and/or a distorted image on a portion of a display resulting from the ambient-light illuminance difference ($AL_1$-$AL_2$) that may be generated on a display. For example, this may occur on a television or computer display in a darken room when a ray of sunlight or a strong indoor spotlight, for example, strikes a portion of the display surface. In other embodiments, multiple shadows may strike and/or multiple ambient light sources may strike multiple regions on a surface of a display resulting in user 80 perceiving a washed out and/or a distorted image on respective multiple regions of a display from the ambient-light illuminance differences.

Note that ambient illuminance refers to the ambient luminous flux per unit area impinging on display 15 in units of lux (lumens per square meter). Similarly, luminous emittance refers to the luminous flux per unit area emitted from display 15. Large illuminance ambient levels may impinge at any angle onto the display resulting in a reflection of the light from the screen. Similarly, luminous emittance of light emitted from the light source in the display is also expressed in units of lux.

However, emitted light from the display may be typically expressed as luminance. Luminance is the product of the illuminance and the reflection coefficient in units of candela per square meter (cd/m$^2$). Luminance is the metric perceived by the user depending on the angle that the display is viewed by the viewer, the ambient-light illuminance directed onto the display, and the luminous emittance emitted from the display. However, embodiments herein teach methods and systems for correcting the washed-out regions and/or distortions due to the illuminance differences as perceived by the user on the display. The differences in the spatial ambient light illuminance in regions 60 and 65, for example, may be corrected by varying the luminous emittance of the display in regions 60 and/or region 65 so as to reduce a luminance difference in regions 60 and 65 from the display as perceived by the user.

In some embodiments, the ambient light illuminance impinging on the display may be at least 0-100 lux (dark room), at least 100-500 lux, at least 500-1500 lux (indoor lighting), at least 1000-5000 lux (outdoor lighting), at least 3000-10,000 lux (shadow cast by a person in direct sunlight on a display screen), at least 10,000-25,000 lux (full daylight, not direct sunlight), at least 20,000-50,000 lux (indoor sunlight falling on a desk or monitor near a window), at least 50,000-75,000 lux (indoor direct sunlight through a window), and at least 100,000-120,000 lux outdoor direct sunlight).

In some embodiments, the display brightness peak luminance may range form 200-470 cd/m$^2$.

Figure 3:
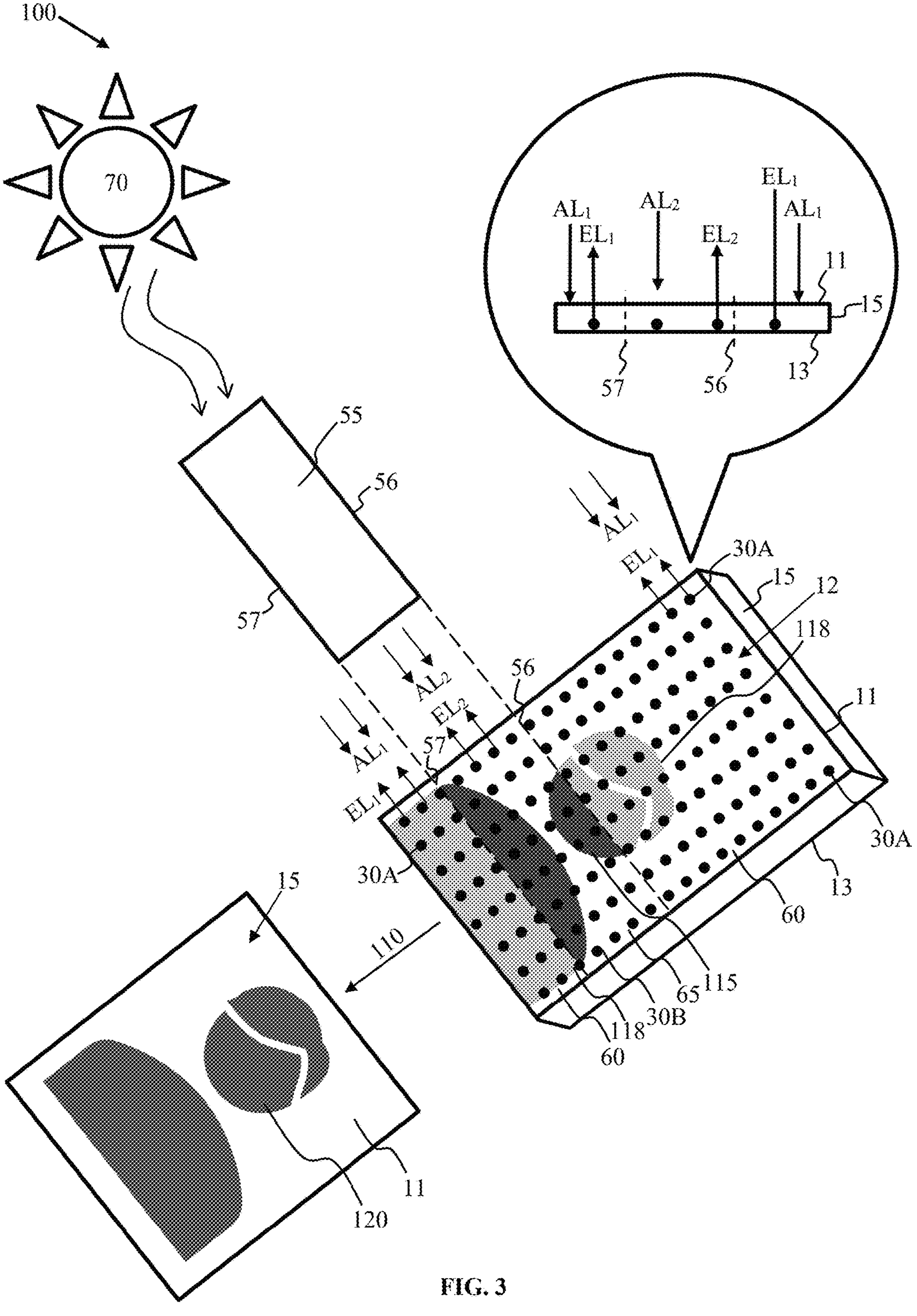
FIG. 3 shows an exemplary embodiment illustrating a method to correct an ambient-light illuminance difference by a shadow cast on mobile device display, in accordance with one or more embodiments of the present disclosure.

FIG. 3 shows an exemplary embodiment 100 illustrating a method to correct an ambient-light illuminance difference by a shadow cast on mobile device display 15, in accordance with one or more embodiments of the present disclosure. Displayed image 12 viewed on front side 11 of display 15 is a facial image of a man. Obstruction 55 with a right side 56 and a left side 57 which may cause a shadow to be cast onto or directed onto display 15 in region 65 on display 15. This results in a portion 115 of facial image 12 in region 65 to appear darker in shadow region 65. A portion 118 of facial image 12 outside of region 65 in region 60, bounded by the projection of shadow edges from right side 56 and left side 57, may appear washed out and/or over-saturated and/or distorted due to the bright ambient sunlight impinging on display 15.

In some embodiments, a controller unit or processor of mobile computing device 10 may be configured to compute an ambient-light illuminance difference ($AL_1$-$AL_2$) using the sensor outputs from light sensors in source/sensor package 30A in region 60 and from source/sensor package 30B in shadowed region 65, and to change the emitted light source output using the light source controls in the light sources in region 65 and/or in region 60 so to reduce a luminance difference from ambient light ($AL_1$ and $AL_2$) impinging on display 15 by varying emitted light $EL_1$ and $EL_2$ from lights sources in display 15. $EL_1$ and $EL_2$ substantially in the opposite direction to $AL_1$ and $AL_2$. The luminance from the display is what the user observes. This, reducing 110 the spatial luminance difference (e.g., in regions 60 and 65, for example) across the display may result in a more uniformly displayed image 120 observed by the user on display 15.

Figure 4:
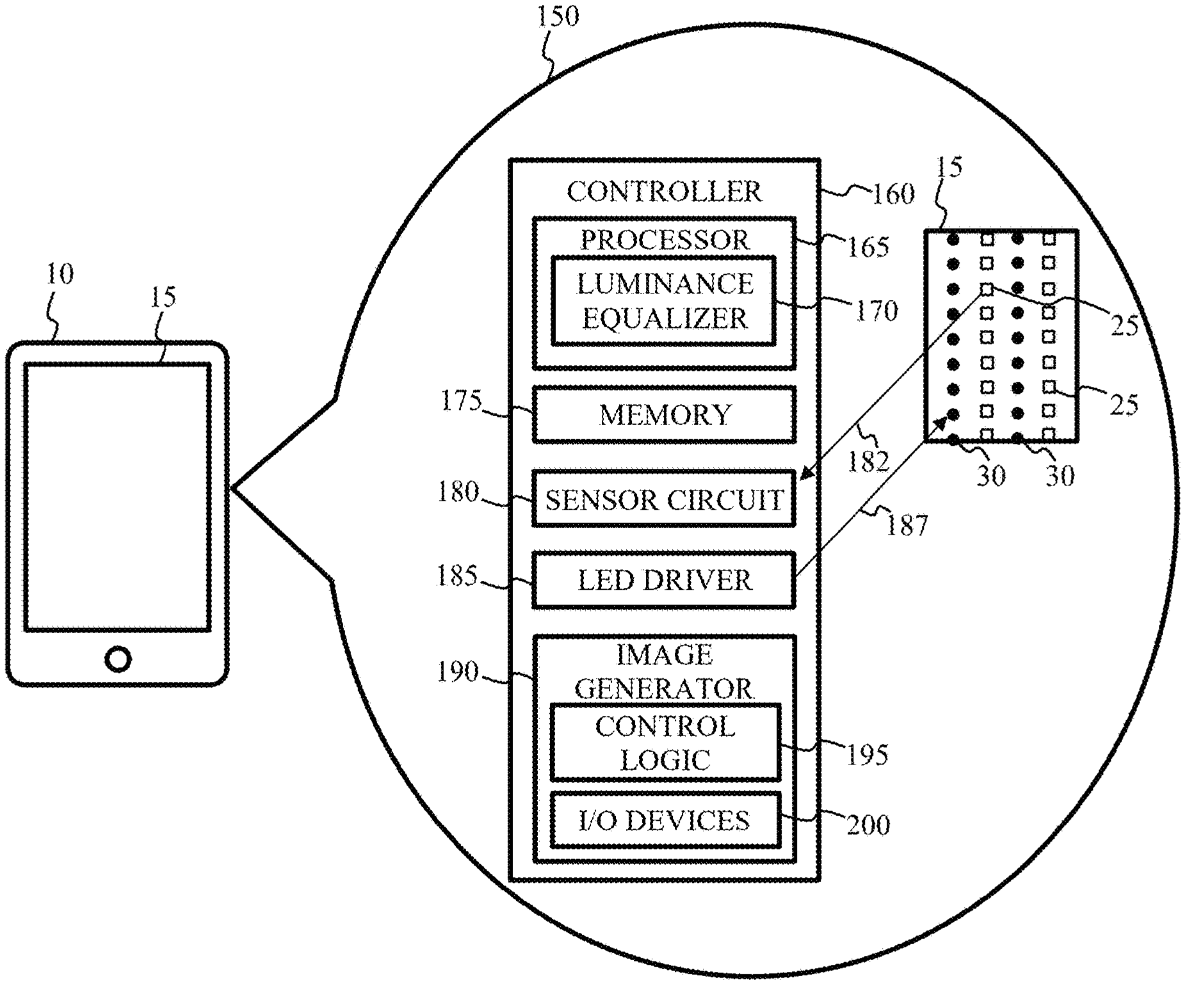
FIG. 4 depicts a block diagram of a mobile device for an correcting ambient-light illuminance difference on a mobile device display, in accordance with one or more embodiments of the present disclosure.

FIG. 4 depicts a block diagram of mobile device 10 for correcting an ambient-light illuminance difference on mobile device display 15, in accordance with one or more embodiments of the present disclosure. As shown in an inset 150, mobile device 10 may include a controller 160 further including a processor 165, a memory 175, sensor circuitry 180, light emitting diode (light source) driver circuitry 185, input and output (I/O) devices 200, and an image generator 190 with control logic 195. Controller 160 (e.g., processor 165) may be configured to execute a illuminance equalizer software module 170 for detecting a spatial illuminance difference of ambient light impinging on display 15. Controller 160 may receive sensor signals 182 from light sensors 25 to compute the spatial illuminance difference on display 15 and may subsequently vary light source controls 187 to each light source 20 using LED driver circuitry 185. In other embodiments, a computer display and/or television display may be controlled by similar circuitry as shown in FIG. 4 for mobile device 10.

In some embodiments, controller 160 may reduce spatial luminance differences in multiple regions of the display to present a uniformly displayed image to the user.

In some embodiments, controller 160 may implement machine learning algorithms using sensor signals 182 from light sensors 25 or in package 30 to detect regions of different illuminance of ambient-light impinging on display 15.

Figure 5:
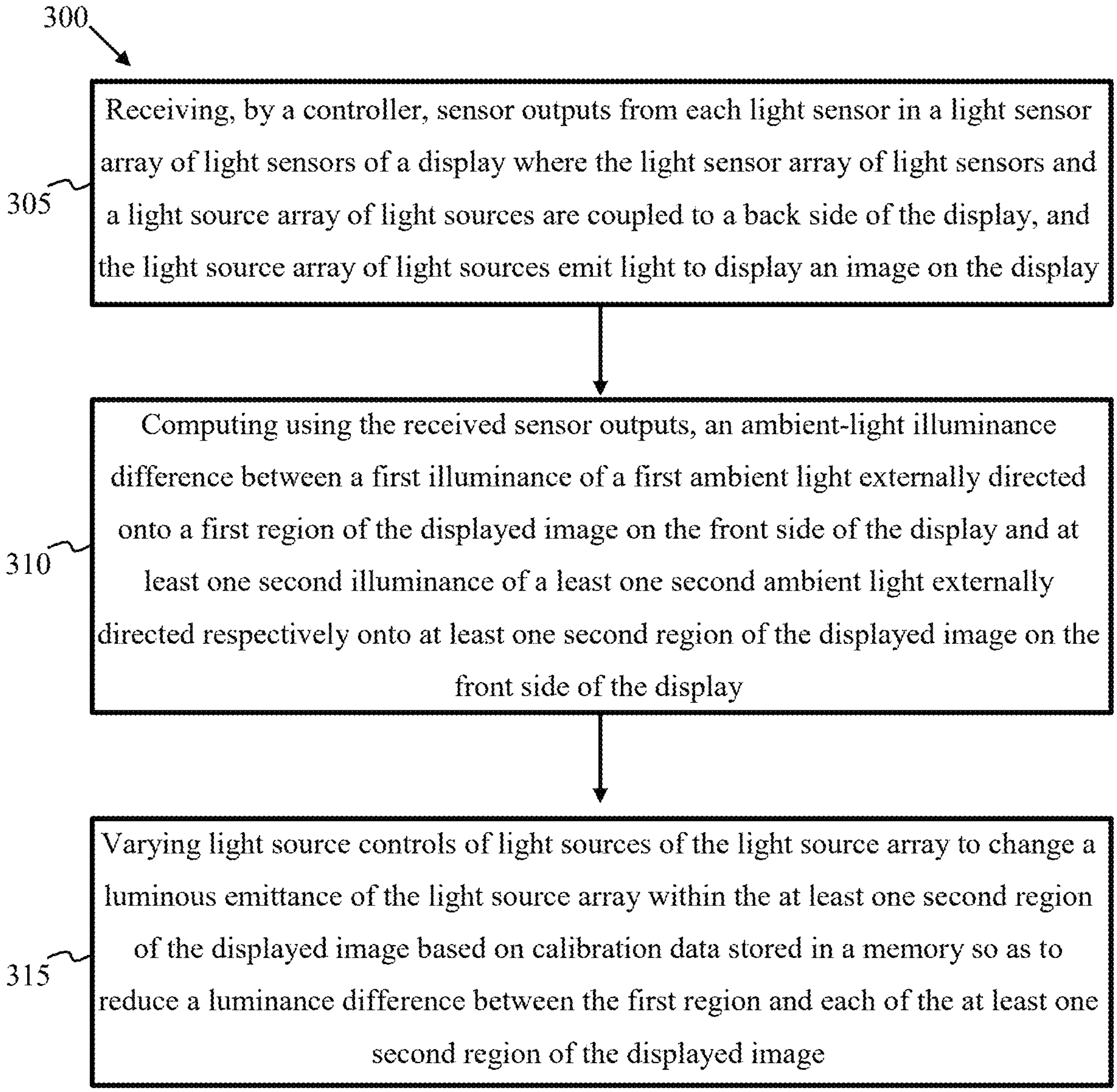
FIG. 5 illustrates a flowchart of an exemplary method for correcting ambient-light illuminance difference on a mobile device display, in accordance with one or more embodiments of the present disclosure.

FIG. 5 illustrates a flowchart of an exemplary method 300 for correcting ambient-light illuminance difference on mobile device display 15, in accordance with one or more embodiments of the present disclosure. Method 300 may be performed by controller 160.

Method 300 may include receiving 305, by controller 160, sensor outputs 182 from each light sensor in light sensor array 29 of light sensors 25 of display 15 where light sensor array 29 of light sensors 25 and a light source array 28 of light sources 20 are coupled to a back side 13 of display 15, and the light source array of light sources emit light to display image 12 on display 15.

Method 300 may include computing 310 using the received sensor outputs 182, an ambient-light illuminance difference between a first illuminance of a first ambient light externally directed onto a first region of displayed image 12 on front side 11 of display 15 and at least one second illuminance of a least one second ambient light externally directed respectively onto at least one second region of the displayed image on the front side of the display Method 300 may include varying 315 light source controls 187 of light sources 20 of light source array 28 to change a luminous emittance (EL) of the light source array within the at least one second region of the displayed image based on calibration data stored in memory 175 so as to reduce a luminance difference between the first region and each of the at least one second region of the displayed image as observed by the user.

In some embodiments, calibrating display 15 may include operating display 15 at different brightness levels in a dark room to detect how much luminous emittance is produced by the emitted light from the screen. Light sensors 25 or in package 30 may be used to detect the luminous emittance at different brightness levels in a dark room, and then to detect the illuminance at different brightness levels of ambient light directed to impinge on the display in the direction opposite to the luminous emittance. Controller 160 may detect and/or compute the luminous emittance from the screen. This data may be stored as calibration data, for example, in memory 175. The calibration data may include a spatial illuminance mapping of ambient light and/or a spatial luminous emittance mapping of emitted light from each of the light sensors and/or light sources in their respective arrays. The mapping may include values of detected illuminance as a function of sensor outputs 182 and/or values of luminous emittance from a light source array as a function of light source controls 187.

In some embodiments, calibrating display 15 may further include operating display 15 with shadows projected onto display 15 (e.g., randomly shaped shadow regions). A camera mounted opposite to display 15 may be used to measure the luminance of display 15 under any suitable condition. Light sources in each of the detected regions with different ambient light illuminance levels may be varied until the displayed image with the shadows may appear even, and/or of the same brightness level, and/or normalized on the camera. In the context of the disclosure herein, normalizing the display may refer to adjusting the emitted light in each of the unique detected regions of different ambient-light illuminance until the luminance differences between each of the unique detected regions are zero. In this case, the user may not visually discern the ambient-light differences impinging on the multiple regions of the display. Stated differently, normalizing the display may be accomplished by computing the minimum and maximum value of each pixel in the displayed image and normalizing them, which smooths out the image to ensure uniformity.

In some embodiments, calibrating the display may include shadowing half of the display and not shadowing the other half of the display. The camera may implement a computer-vision model for example, for detecting when the display is normalized after adjusting the luminous emittance in either of the two halves so the luminance between the two region halves on the display may be substantially identical in value.

In some embodiments, controller 160 may be configured to implement a power-saving mode by reducing the luminous emittance of a brighter region of the displayed image relative to the luminous emittance of a darker region of the displayed image so as to reduce a luminance difference spatially across all regions of the display.

In some embodiments, the calibration data may relate the luminous emittance from the light source array to the light source controls controlling the emitted light from the light sources of the light source array using linear regression functions, for example.

In some embodiments, controller 160 may use control logic 195 of image generator 190 for generating the displayed image on the display.

In some embodiments, controller 160 may be configured to reduce a luminance difference by using control logic 195 of image generator 190 to change pixel values of pixels within the multiple detected ambient-light regions of different illuminance to generate the displayed image with digitally compensated reduced luminance differences spatially across the display as perceived by the user. In this manner, either the illuminance differences may be compensated by varying the control signals to the light sources, by controlling the image itself for displaying on the display that is being generated by image generator 190, or both.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35).NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, an apparatus may include:

a display with a front side and a back side;

a memory;

a light sensor array of light sensors and a light source array of light sources may be couple to the back side of the display;

wherein the light source array of light sources may emit light to display an image on the display; and a controller configured to:

receive a sensor output from each light sensor in the light sensor array;

compute, using the received sensor outputs, an ambient-light illuminance difference between a first illuminance of a first ambient light externally directed onto a first region of the displayed image on the front side of the display and at least one second illuminance of a least one second ambient light externally directed respectively onto at least one second region of the displayed image on the front side of the display;

vary light source controls of light sources of the light source array to change a luminous emittance of the light source array within the at least one second region of the displayed image based on calibration data stored in the memory so as to reduce a luminance difference between the first region and each of the at least one second region of the displayed image;

wherein the calibration data may relate the luminous emittance from the light source array to the light source controls controlling the emitted light from the light sources of the light source array; and wherein the luminous emittance from the displayed image may be substantially opposite to the first illuminance of the first ambient light and the at least one second illuminance of the at least one second ambient light directed onto the displayed image.

In some embodiments, the display may be a display of a mobile device.

In some embodiments, the display may be a television display or a computer display.

In some embodiments, the controller may be configured to compute the ambient-light illuminance difference between the first region and the at least one second region when the at least one second ambient light is formed from at least one shadow cast over the at least one second region of the displayed image.

In some embodiments, the first region and each of the at least one second region may be each randomly shaped.

In some embodiments, the light sources may be light emitting diodes.

In some embodiments, the light sensors and the light sources may include dual function light emitting diodes.

In some embodiments, the light source array and the light sensor array may be the same array.

In some embodiments, the calibration data stored in the memory may include a spatial illuminance detection mapping over the light sensor array as a function of the light sensor outputs from each of the light sensors in the light sensor array.

In some embodiments, the apparatus may further include an image generator with control logic for generating the displayed image on the display.

In some embodiments, the controller may be configured to reduce the luminance difference by using the control logic of the image generator to change pixel values of pixels within the at least one second region of the generated displayed image.

In some embodiments, a method may include:

receiving, by a controller, sensor outputs from each light sensor in a light sensor array of light sensors of a display;

wherein the display may include a front side and a back side;

wherein the light sensor array of light sensors and a light source array of light sources may be coupled to the back side of the display;

wherein the light source array of light sources may emit light to display an image on the display;

computing, by the controller using the received sensor outputs, an ambient-light illuminance difference between a first illuminance of a first ambient light externally directed onto a first region of the displayed image on the front side of the display and at least one second illuminance of a least one second ambient light externally directed respectively onto at least one second region of the displayed image on the front side of the display;

varying, by the controller, light source controls of light sources of the light source array to change a luminous emittance of the light source array within the at least one second region of the displayed image based on calibration data stored in a memory so as to reduce a luminance difference between the first region and each of the at least one second region of the displayed image;

wherein the calibration data may relate the luminous emittance from the light source array to the light source controls controlling the emitted light from the light sources of the light source array; and wherein the luminous emittance from the displayed image may be substantially opposite to the first illuminance of the first ambient light and the at least one second illuminance of the at least one second ambient light directed onto the displayed image.

In some embodiments, the light sources may be light emitting diodes.

In some embodiments, the light sensors and the light sources may include dual function light emitting diodes.

In some embodiments, the light sensor array and the light sources array may be the same array.

In some embodiments, the first region and each of the at least one second region may be each randomly shaped.

In some embodiments, the calibration data stored in the memory may include a spatial illuminance detection mapping over the light sensor array as a function of the light sensor outputs from each of the light sensors in the light sensor array.

In some embodiments, the method may further include implementing, by the controller, a power-saving mode by reducing the luminous emittance of a brighter region of the displayed image relative to the luminous emittance of a darker region of the displayed image to reduce the luminance difference.

In some embodiments, the method may further include calibrating, by the controller, the display in a dark room for measuring a luminous emittance that the display generates from the light source array of light sources using the light sensor array of light sensors and storing data of the measured luminous emittance in the memory.

In some embodiments, the controller may include an image generator to generate the displayed image, and the method may further include reducing, by the controller, the luminance difference using control logic of the image generator to change pixel values of pixels within the at least one second region of the generated displayed image.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A non-transitory computer readable medium having instructions stored thereon that, upon execution by a controller, cause the controller to:

receive first data indicative of an ambient-light illuminance difference between a first illuminance of a first ambient light directed onto a first region of a display and a second illuminance of at least one second ambient light directed onto a second region of the display, wherein:

the first illuminance of the first ambient light is less than the second illuminance of the second ambient light;

the ambient-light illuminance difference is determined based on second data indicative of sensor outputs of a light sensor array associated with the display;

the light sensor array comprises:

a first group of sensors at or near one or more edges of the display, the first group of sensors configured to detect the first illuminance; and a second group of sensors spaced away from the one or more edges of the display, the second group of sensors configured to detect the second illuminance; and the second region overlaps with two or fewer edges of the display, and any edges of the two or fewer edges are different from the one or more edges of the display along which the first group of sensors is located, such that the second region is oriented over the second group of sensors and not the first group of sensors; and send third data indicative of a control signal to control emitted light a light source array of the array, the control signal configured to cause the light source array to change a luminous emittance of the light source array within at least one of the first region or the second region of the display based on the ambient-light illuminance difference.

2. The non-transitory computer readable medium according to claim 1, wherein the luminous emittance of the light source array is further changed based on calibration data stored in a memory.

3. The non-transitory computer readable medium according to claim 2, wherein the calibration data stored in the memory comprises a spatial illuminance detection mapping over the light sensor array as a function of light sensor outputs from each light sensor of the light sensor array.

4. The non-transitory computer readable medium according to claim 1, wherein the luminous emittance of the light source array is changed to reduce a spatial luminance difference between the first region and the second region such that the display presents a uniformly displayed image to a user.

5. The non-transitory computer readable medium according to claim 1, wherein light sources of the light source array are light emitting diodes.

6. The non-transitory computer readable medium according to claim 1, wherein light sensors of the light sensor array and light sources of the light source array together comprise dual function light emitting diodes.

7. The non-transitory computer readable medium according to claim 1, wherein the light sensor array and light sources the light source array are a same array.

8. The non-transitory computer readable medium according to claim 1, wherein the instructions further cause the controller to implement a power-saving mode by reducing the luminous emittance of a brighter region of a displayed image relative to the luminous emittance of a darker region of the displayed image to reduce the ambient-light illuminance difference.

9. The non-transitory computer readable medium according to claim 1, wherein the instructions further cause the controller to calibrate the display in a dark room for measuring the luminous emittance that the display generates from the light source array using the light sensor array and storing data of the measured luminous emittance in a memory.

10. The non-transitory computer readable medium according to claim 1, wherein the controller comprises an image generator to generate a displayed image, and wherein the instructions further cause the controller to reduce the ambient-light illuminance difference using control logic of the image generator to change pixel values of pixels within at least one of the first region or the second region.

11. The non-transitory computer readable medium according to claim 1, wherein the instructions further cause the controller to calibrae the display by projecting shadows onto the display and measuring the luminance emittance of the display using an imaging camera mounted opposite to the display to obtain images of the shadowed display.

12. The non-transitory computer readable medium according to claim 1, wherein the instructions further cause the controller to calibrating the display by normalizing the display by adjusting the emitted light from light sources in each detected regions on the display having different spatial ambient-light illuminance until the spatial luminance differences between each of the detected regions are zero.

13. A method comprising:

receiving, by a controller of a computing device, first data indicative of an ambient-light illuminance difference between a first illuminance of a first ambient light directed onto a first region of a display and a second illuminance of at least one second ambient light directed onto a second region of the display, wherein:

the first illuminance of the first ambient light is less than the second illuminance of the second ambient light;

the ambient-light illuminance difference is determined based on second data indicative of sensor outputs of a light sensor array associated with the display;

the light sensor array comprises:

a first group of sensors at or near one or more edges of the display, the first group of sensors configured to detect the first illuminance; and a second group of sensors spaced away from the one or more edges of the display, the second group of sensors configured to detect the second illuminance; and the second region overlaps with two or fewer edges of the display, and any edges of the two or fewer edges are different from the one or more edges of the display along which the first group of sensors is located, such that the second region is oriented over the second group of sensors and not the first group of sensors; and sending, by the controller, third data indicative of a control signal to control emitted light a light source array of the array, the control signal configured to cause the light source array to change a luminous emittance of the light source array within at least one of the first region or the second region of the display based on the ambient-light illuminance difference.

14. A non-transitory computer readable medium having instructions stored thereon that, upon execution by a controller, cause the controller to:

receive first data indicative of an ambient-light illuminance difference between a first illuminance of a first ambient light directed onto a first region of a display and a second illuminance of a least one second ambient light directed respectively onto a second region of the display, wherein:

the first illuminance is detected by a first portion of a light sensor array in the first region;

the second illuminance is detected by a second portion of the light sensor array in the second region;

the first region is different from the second region and the first portion of the light sensor array is different from the second portion of the light sensor array;

the ambient-light illuminance difference is determined based on the first illuminance and the second illuminance; and the display comprises the light sensor array and a light source array configured to emit light to display an image on the display; and send second data indicative of a control signal to control the light emitted from the light source array to change a luminous emittance of the light source array within at least one of the first region or the second region of the displayed image based on calibration data stored in a memory so as to reduce a spatial luminance difference between the first region and the second region of the displayed image on the display so as to present a uniformly displayed image to a user, wherein the calibration data relates the luminous emittance from the light source array to light source controls that control emitted light from the light source array.

15. The non-transitory computer readable medium according to claim 14, wherein the calibration data stored in the memory comprises a spatial illuminance detection mapping over the light sensor array as a function of light sensor outputs from each light sensor of the light sensor array.

16. The non-transitory computer readable medium according to claim 14, wherein light sources of the light source array are light emitting diodes.

17. The non-transitory computer readable medium according to claim 14, wherein the light sensors of the light sensor array and light sources of the light source array together comprise dual function light emitting diodes.

18. The non-transitory computer readable medium according to claim 14, wherein the instructions further cause the controller to implement a power-saving mode by reducing the luminous emittance of a brighter region of a displayed image relative to the luminous emittance of a darker region of the displayed image to reduce the ambient-light illuminance difference.

19. The non-transitory computer readable medium according to claim 14, wherein the instructions further cause the controller to calibrate the display in a dark room for measuring the luminous emittance that the display generates from the light source array using the light sensor array and storing data of the measured luminous emittance in a memory.

20. The non-transitory computer readable medium according to claim 14, wherein the instructions further cause the controller to calibrate the display by projecting shadows onto the display and measuring the luminance emittance of the display using an imaging camera mounted opposite to the display to obtain images of the shadowed display.

* * * * *